(12) United States Patent
Kulkarni

(10) Patent No.: US 11,126,630 B2
(45) Date of Patent: Sep. 21, 2021

(54) RANKING PARTIAL SEARCH QUERY RESULTS BASED ON IMPLICIT USER INTERACTIONS

(71) Applicant: salesforce.com, inc., San Francisco, CA (US)

(72) Inventor: Swapnil Sanjay Kulkarni, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 117 days.

(21) Appl. No.: 15/973,377

(22) Filed: May 7, 2018

(65) Prior Publication Data

US 2019/0340256 A1  Nov. 7, 2019

(51) Int. Cl.
*G06F 16/2457* (2019.01)
*G06F 16/248* (2019.01)
*G06F 16/9535* (2019.01)
*G06F 3/0486* (2013.01)
*G06F 3/0483* (2013.01)
*G06F 3/0482* (2013.01)

(52) U.S. Cl.
CPC ...... *G06F 16/24578* (2019.01); *G06F 16/248* (2019.01); *G06F 16/9535* (2019.01); *G06F 3/0482* (2013.01); *G06F 3/0483* (2013.01); *G06F 3/0486* (2013.01)

(58) Field of Classification Search
CPC .............................................. G06F 16/24578
See application file for complete search history.

(56) References Cited

U.S. PATENT DOCUMENTS

| 8,311,875 | B1 | 11/2012 | Lloyd | |
|---|---|---|---|---|
| 8,898,150 | B1 | 11/2014 | Kuramochi et al. | |
| 2005/0149498 | A1* | 7/2005 | Lawrence | G06F 16/951 |
| 2006/0149710 | A1* | 7/2006 | Koningstein | G06Q 30/02 |
| 2006/0248057 | A1* | 11/2006 | Jacobs | G06F 16/9535 |
| 2006/0253428 | A1 | 11/2006 | Katariya et al. | |
| 2007/0016553 | A1 | 1/2007 | Dumais et al. | |

(Continued)

OTHER PUBLICATIONS

Craswell, N. et al., "Random Walks on the Click Graph," Proceedings of SIGIR 2007, Jul. 2007, eight pages.

(Continued)

*Primary Examiner* — Pierre M Vital
*Assistant Examiner* — Andrew N Ho
(74) *Attorney, Agent, or Firm* — Fenwick & West LLP

(57) ABSTRACT

A client device receives search queries and displays via a user interface, search results representing a set of the records based on the search queries. The client device monitors implicit user interactions with search query terms and records displayed in response to various search queries, for example, implicit user interactions representing movements of cursor on the portion of user interface displaying a particular record. The client device receives a partial search query. Partial search results representing a set of the records based on the partial search query are determined for display via the user interface. The relevance score for each record is determined based on implicit user interactions associated with past search queries. The partial search results are ranked based on the relevance scores and displayed by the client device according to the ranked order.

20 Claims, 10 Drawing Sheets

(56) References Cited

U.S. PATENT DOCUMENTS

| | | | |
|---|---|---|---|
| 2007/0150466 A1* | 6/2007 | Brave | G06F 16/9535 |
| 2007/0150515 A1* | 6/2007 | Brave | G06F 16/9535 |
| 2008/0114751 A1 | 5/2008 | Cramer et al. | |
| 2008/0256050 A1* | 10/2008 | Zhang | G06F 16/9535 |
| 2008/0313574 A1 | 12/2008 | Aravamudan et al. | |
| 2010/0153428 A1* | 6/2010 | Schechter | G06F 16/9535 |
| | | | 707/768 |
| 2011/0184883 A1* | 7/2011 | El-Charif | G06F 16/24578 |
| | | | 705/348 |
| 2012/0047134 A1* | 2/2012 | Hansson | G06Q 30/0275 |
| | | | 707/731 |
| 2012/0209840 A1 | 8/2012 | Gur | |
| 2013/0024440 A1 | 1/2013 | Dimassimo et al. | |
| 2013/0159507 A1* | 6/2013 | Mason | G06Q 10/10 |
| | | | 709/224 |
| 2013/0204825 A1 | 8/2013 | Su | |
| 2013/0246383 A1* | 9/2013 | White | G06F 16/9535 |
| | | | 707/706 |
| 2014/0046934 A1 | 2/2014 | Zhou et al. | |
| 2014/0108445 A1* | 4/2014 | Oztekin | G06F 16/90324 |
| | | | 707/767 |
| 2014/0181204 A1* | 6/2014 | Sharp | H04L 67/22 |
| | | | 709/204 |
| 2014/0337436 A1 | 11/2014 | Hoagland et al. | |
| 2016/0110437 A1 | 4/2016 | Patel et al. | |
| 2016/0140230 A1 | 5/2016 | Villeneuve et al. | |
| 2016/0283585 A1 | 9/2016 | Zheng | |
| 2016/0378758 A1 | 12/2016 | Green et al. | |
| 2017/0132203 A1 | 5/2017 | Kim et al. | |
| 2017/0255476 A1 | 9/2017 | Whitney et al. | |
| 2018/0059875 A1 | 3/2018 | Siegelmann et al. | |
| 2019/0163782 A1 | 5/2019 | Drushku | |

OTHER PUBLICATIONS

Huang, J. et al., "No Clicks, No Problem: Using Cursor Movements to Understand and Improve Search," CHI 2011, May 7-12, 2011, ten pages.

Wue, G. et al., "Optimizing Web Search Using Web Click-through Data," CIKM'04, Nov. 8-13, 2004, pp. 118-126.

United States Office Action, U.S. Appl. No. 15/857,613, filed Dec. 3, 2019, 20 pages.

United States Office Action, U.S. Appl. No. 15/857,613, filed Mar. 26, 2020, 27 pages.

United States Office Action, U.S. Appl. No. 16/177,334, filed Jun. 24, 2020, 24 pages.

United States Office Action, U.S. Appl. No. 16/177,334, filed Dec. 17, 2020, 30 pages.

United States Office Action, U.S. Appl. No. 16/177,334, filed Jun. 25, 2021, 25 pages.

* cited by examiner

RANKING PARTIAL SEARCH QUERY RESULTS BASED ON IMPLICIT USER INTERACTIONS

BACKGROUND

Field of Art

The disclosure relates in general to ranking of records displayed via a client device and in particular to ranking partial search query results based on implicit user interactions with a user interface presenting the records.

DESCRIPTION OF THE RELATED ART

Online systems used by enterprises, organizations, and businesses store large amounts of information. These systems allow users to perform searches for information. Online systems often list certain records when the user begins a search, and update the list as the user continues to enter the search query. Search results that are presented to a user before the user completes entering the search terms are referred to a partial search query results since they are generated based on a partial search query.

The user may obtain what was desired from the search query from the displayed results without explicitly interacting with them, for example, by reviewing the summary of an article title presented with the search results. As a result, even though a specific result was ideal for the user, the online system does not get a user interaction indicating that the user consumed that specific result.

An online system deploys a search engine that scores documents using different signals, and returns a list of results ranked in order of relevance. The relevance may depend upon a number of factors, for example, how well the search query matches the document, the document's freshness, the document's reputation, and the user's interaction feedback on the results. A result click provides a clear intent that the user was interested in the search result. Therefore, the result click usually serves as a primary signal for improving the search relevance. However, there are several known limitations of the result click data.

Search engine results page often presents a result in the form of a summary that typically includes a title of the document, a hyperlink, and a contextual snippet with highlighted keywords.

Contextual snippet usually includes an excerpt of the matched data, allowing user to understand why and how a result was matched to the search query. Often this snippet includes additional relevant information about the result, thereby saving the user a click or a follow up search. For example, a user may search for an account and the result summary may present additional details about the given account such as contact information, mailing address, active sales pipeline, and so on. If the user was simply interested in the contact information for the searched account, the summary content satisfies the user's information need. Accordingly, the user may never perform a result click.

Similarly, searches on unstructured data, particularly text data like knowledge articles or feed results tend to produce fewer or no clicks. For these, the user may simply read and successfully consume search results without generating any explicit interaction data. Improved search result summaries and unstructured data searches typically tend to reduce the search click data volume, thereby inversely affecting user feedback data collected by the online system that is used for search relevance.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1A:
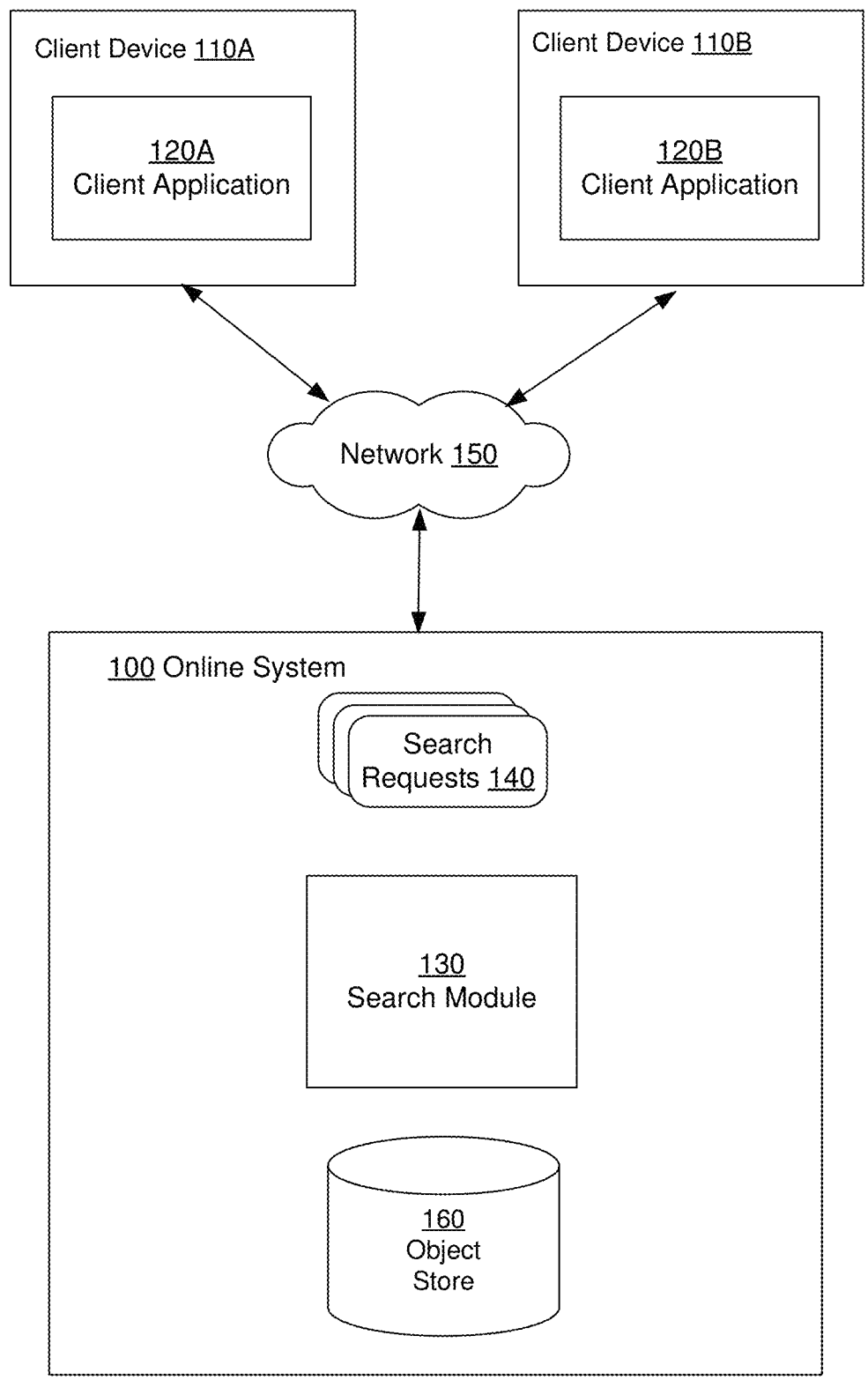
FIG. 1A shows an overall system environment illustrating an online system receiving search requests from clients and processing them, in accordance with an embodiment.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

System Overview

A system receives a search query, identifies search results that match the search query and presents the search results to the requestor. For example, a user may provide a search query via a user interface and click on a submit button to provide the search query. However, the system also processes a partial search query representing a portion of the full search query provided by the user. The system may process a partial search query to provide results representing one or more of (1) additional search terms that the user is likely to be interested in providing in order to complete the partial search query or (2) search results that are based on the partial search query. These results are referred to herein as partial search query results. Partial search query results are also referred to as instant search results or instant results.

Partial search query results provide an insight into the search query that the user is constructing, as the user continues building the search query. For example, a user may enter some of the search query terms and inspect the partial search query results to determine the subsequent search query terms, before providing the final search query to the system. Alternatively, predicted search query terms may be presented to the user, for example, in a drop down list to allow the user to select for adding to the partial search query.

Displaying partial search query results via the search user interface provides an improved user experience and allows a user to build better search queries. However, the system must provide the partial search query results very fast to the user as the user is providing the search query terms or else the partial search query results do not add value to the query building process. As a result, the efficiency of computation of partial search query results is significant.

Furthermore, the ranking of the partial search query results is significant, since the relevant partial search query results must be displayed promptly, thereby providing guidance regarding the subsequent search query terms to be added to the partial search query for completing the search query. This allows the user to make better judgment regarding the search query that the user is building.

In some embodiments, the system uses most recently used objects or records that the user was interested in for determining the partial search query results. In another embodiment, the system uses the most frequently used objects or records for determining the partial search query results. These records may be stored on the client device that is used by the user for providing the search query. This makes the process of determining the partial search query results efficient. However, other embodiments access partial search query results from the online system.

FIG. 1A shows an overall system environment illustrating an online system receiving search queries (also referred to as search requests) from clients and processing them, in accordance with an embodiment. The overall system environment includes an online system 100, one or more client devices 110, and a network 150. Other embodiments may use more or fewer or different systems than those illustrated in FIG. 1A. Functions of various modules and systems described herein can be implemented by other modules and/or systems than those described herein.

FIG. 1A and the other figures use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral (e.g. "120" in the text refers to reference numerals "120A" and/or "120B" in the figures).

A client device 110 is used by users to interact with the online system 100. A user interacts with the online system 100 using client device 110 executing client application 120. An example of a client application 120 is a browser application. The client application provides a user interface that allows users to enter search requests and view search results. In an embodiment, the client application 120 interacts with the online system 100 using HTTP requests sent over network 150.

The online system 100 includes an object store 160 and a search module 130. The online system 100 receives search requests 140 from users via the client devices 110. The object store 160 stores data represented as objects. Each object represents an entity associated with an enterprise and comprises a timestamp indicating a time of most recent access. A search request 140 specifies certain search criteria, for example, search terms, logical operators specifying relations between search terms, and so on. The search module 130 processes the search requests 140 and determines search results comprising objects that match the search criteria specified in the search request 140, and also relevant candidate objects. A system refers to either the client device 110 or the online system 100. For example, a task performed by the system refers to a task performed by a module executing in either the online system 100 or in the client device 110.

The online system determines a set of candidate objects as potential partial search query results. A candidate object may also be referred to herein as a candidate record since the object may be stored as a record. In an embodiment, the set of candidate objects represents most recently used objects. In another embodiment, the set of candidate objects represents as most frequently used objects. The set of candidate objects is not limited to these embodiments and can comprise objects selected by other criteria or using a combination of criteria.

The system ranks the candidate objects based on a measure of likelihood that the user is interested in each candidate object. The system uses features extracted from the candidate objects to rank them. In an embodiment, the system determines a relevance score for each candidate object based on a weighted aggregate of the features describing the candidate object. Each feature is weighted based on a feature weight associated with the feature. The system adjusts the feature weights to improve the ranking of candidate objects. For example, as a search request is received, the system identifies 500 candidate objects and ranks them based on their relevancy scores, displaying the top 5 ranked candidate objects.

The system stores information describing past search requests, for example, in logs. The stored information comprises, for each stored search request, the search request, the set of candidate objects returned in response to the search request, and user interactions that may have been performed by the user specific candidate objects returned as results (including explicit user interactions and implicit user interactions). The system monitors which objects were of interest to the user based on user interactions responsive to the user being presented with the objects. Accordingly, if the system receives a data access request for a candidate object, the system marks the given object as an accessed candidate object.

In some embodiments, an online system 100 stores information of one or more tenants to form a multi-tenant system. Each tenant may be an enterprise as described herein. As an example, one tenant might be a company that employs a sales force where each salesperson uses a client device 110 to manage their sales process. Thus, a user might maintain contact data, leads data, customer follow-up data, performance data, goals and progress data, etc., all applicable to that user's personal sales process.

In one embodiment, online system 100 implements a web-based customer relationship management (CRM) system. For example, in one embodiment, the online system 100 includes application servers configured to implement and execute CRM software applications as well as provide related data, code, forms, webpages and other information to and from client devices 110 and to store to, and retrieve from, a database system related data, objects, and webpage content.

With a multi-tenant system, data for multiple tenants may be stored in the same physical database, however, tenant data typically is arranged so that data of one tenant is kept logically separate from that of other tenants so that one tenant does not have access to another tenant's data, unless such data is expressly shared. In certain embodiments, the online system 100 implements applications other than, or in addition to, a CRM application. For example, the online system 100 may provide tenant access to multiple hosted (standard and custom) applications, including a CRM application. According to one embodiment, the online system 100 is configured to provide webpages, forms, applications, data and media content to client devices 110 to support the access by client devices 110 as tenants of online system 100. As such, online system 100 provides security mechanisms to keep each tenant's data separate unless the data is shared.

A multi-tenant system may implement security protocols that keep data, applications, and application use separate for different tenants. In addition to user-specific data and tenant-specific data, the online system 100 may maintain system level data usable by multiple tenants or other data. Such system level data may include industry reports, news, postings, and the like that are sharable among tenants.

It is transparent to customers that their data may be stored in a table that is shared with data of other customers. A database table may store rows for a plurality of customers. Accordingly, in a multi-tenant system various elements of hardware and software of the system may be shared by one or more customers. For example, the online system 100 may execute an application server that simultaneously processes requests for a number of customers.

In an embodiment, the online system 100 optimizes the set of feature weights for each tenant of a multi-tenant system. This is because each tenant may have a different usage pattern for the candidate objects. Accordingly, candidate objects that are relevant for a first tenant may not be very relevant for a second tenant. Therefore, the online system determines a first set of feature weights for the first tenant and a second set of feature weights for the second tenant. Furthermore, in an embodiment, the online system 100 optimizes the set of feature weights for each user as member of a tenant in multi-tenant system. This is because each user may have a different usage pattern for candidate objects, or may have very different candidate objects from other users who are members of the tenant. Accordingly, candidate objects that are relevant for a first user may not be very relevant for a second user. Therefore, the online system determines a first set of feature weights for the first user and a second set of feature weights for the second user.

The online system 100 and client devices 110 shown in FIG. 1A can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. The online system 100 stores the software modules storing instructions for embodiments, for example search module 130.

The interactions between the client devices 110 and the online system 100 are typically performed via a network 150, for example, via the Internet. In one embodiment, the network uses standard communications technologies and/or protocols. In another embodiment, the entities can use custom and/or dedicated data communications technologies instead of, or in addition to, the ones described above. The techniques disclosed herein can be used with any type of communication technology, so long as the communication technology supports receiving by the online system 100 of web requests from a sender, for example, a client device 110 and transmitting of results obtained by processing the web request to the sender.

Figure 1B:
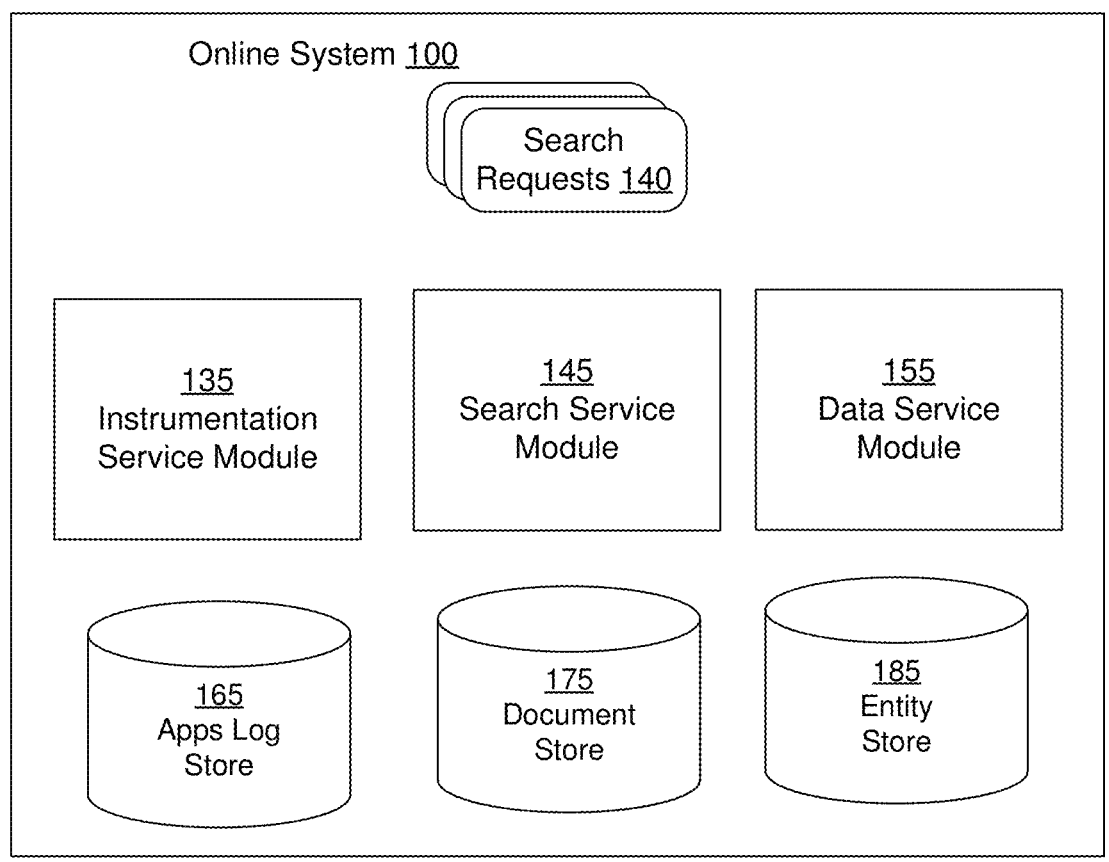
FIG. 1B shows an overall system environment illustrating an online system receiving search requests from clients and processing them, in accordance with an embodiment.

FIG. 1B show an overall system environment illustrating an online system receiving search requests from clients and processing them, in accordance with another embodiment. As shown in FIG. 1B, the online system includes an instrumentation service module 135, a search service module 145, a data service module 155, an apps log store 165, a document store 175, and an entity store 185. The functionality of modules shown in FIG. 1B may overlap with the functionality of modules shown in FIG. 1A.

The online system 100 receives search requests 140 having different search criteria from clients. The search service module 145 executes searches and returns the most relevant results matching search criteria received in the search query.

The instrumentation service module 135 is a logging and monitoring module that receives logging events from different clients. The instrumentation service module 135 validates these events against pre-defined schemas. The instrumentation service module 135 may also enrich events with additional metadata like user id, session id, etc. Finally, the instrumentation service module 135 publishes these events as log lines to the app logs store 165.

The data service module 155 handles operations such as document and entity create, view, save and delete. It may also provide advanced features such as caching and offline support.

The apps log store 165 stores various types of application logs. Application logs may include logs for both clients as well different modules of the online system itself.

The entity store 185 stores details of entities supported by an enterprise. Entities may represent an individual account, which is an organization or person involved with a particular business (such as customers, competitors, and partners). It may represent a contact, which represents information describing an individual associated with an account. It may represent a customer case that tracks a customer issue or problem, a document, a calendar event, and so on.

Each entity has a well-defined schema describing its fields. For example, an account may have an id, name, number, industry type, billing address etc. A contact may have an id, first name, last name, phone, email etc. A case may have a number, account id, status (open, in-progress, closed) etc. Entities might be associated with each other. For example, a contact may have a reference to account id. A case might include references to account id as well as contact id.

The document store 175 stores one or more documents of supported entity types. It could be implemented as a traditional relational database or NoSQL database that can store both structured and unstructured documents.

System Architecture

Figure 2A:
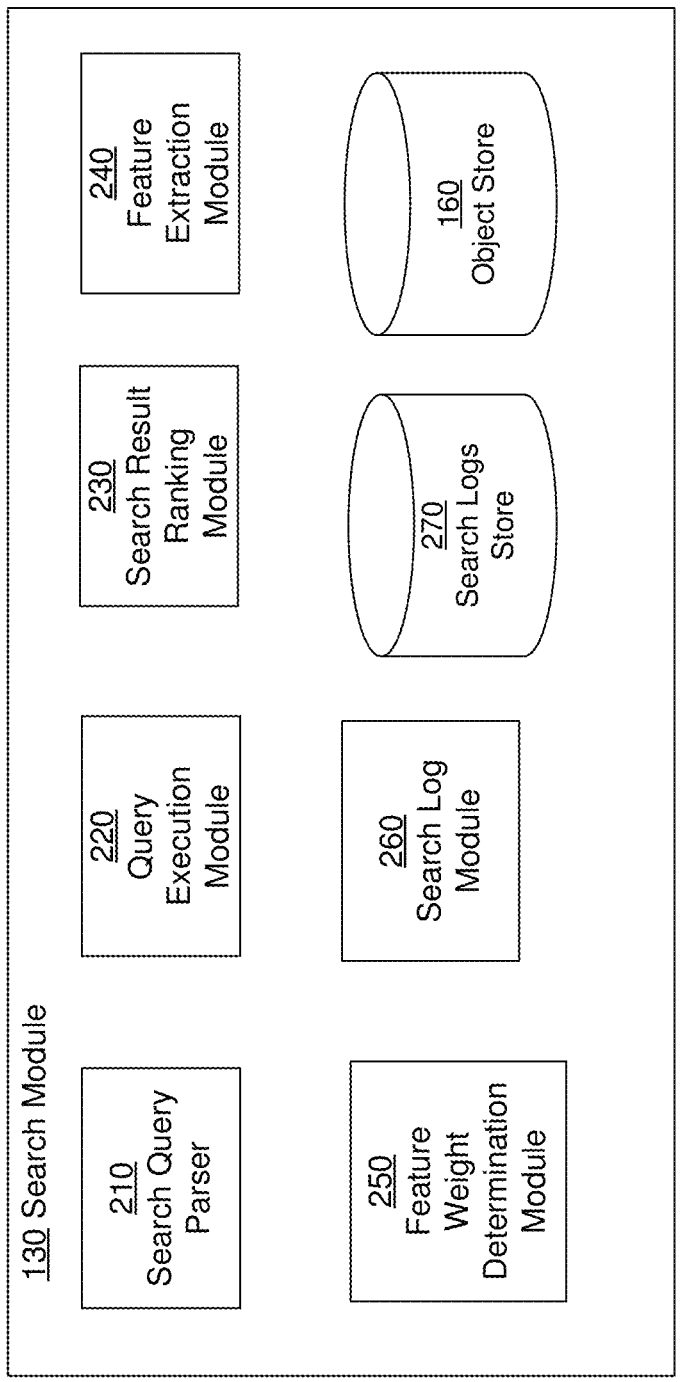
FIG. 2A shows the system architecture of a search module, in accordance with an embodiment.

FIG. 2A shows the system architecture of a search module, in accordance with an embodiment. The search module 130 comprises a search query parser 210, a query execution module 220, a search result ranking module 230, a search log module 260, a feature extraction module 240, a feature weight determination module 250, and a search logs store 270, and may comprise the object store 160. Other embodiments may include more or fewer modules. Functionality indicated herein as being performed by a particular module may be performed by other modules.

The object store 160 stores objects representing entities associated with an enterprise. An enterprise may be an organization, a business, a company, a club, or a social group. An object may have an object type associated with a type of entity described by the object. Examples of object type include an account, a contact, a lead, an opportunity, and so on. It should be understood that the word "entity" may also be used interchangeably herein with "object".

An object may represent an account representing a business partner or potential business partner (e.g. a client, vendor, distributor, etc.) of a user, and may include attributes describing a company, subsidiaries, or contacts at the company. As another example, an object may represent a project that a user is working on, such as an opportunity (e.g. a possible sale) with an existing partner, or a project that the user is trying to get. An object may represent an account representing a user or another entity associated with the enterprise. For example, an account may represent a customer of the first enterprise. An object may represent a user of the online system.

In an embodiment, the object store 160 stores an object as one or more records in a database. An object has data fields that are defined by the structure of the object (e.g. fields of certain data types and purposes). For example, an object representing an entity may store information describing the potential customer, a status of the opportunity indicating a stage of interaction with the customer, and so on. An object may represent a case that represents an interaction with a customer. For example, if a customer interacts with a user associated with the online system to provide feedback, complaint, or comments associated with a business, the interaction is recorded as a case object. The case object may include attributes such as a date of interaction, information identifying the user initiating the interaction, description of the interaction, and status of the interaction indicating whether the case is newly opened, resolved, or in progress.

The object store 160 may be implemented as a relational database storing one or more tables. Each table contains one or more data categories logically arranged as columns or fields. Each row or record of a table contains an instance of data for each category defined by the fields. For example, an object store 160 may include a table that describes a customer with fields for basic contact information such as name, address, phone number, fax number, etc. Another table might describe a purchase order, including fields for information such as customer, product, sale price, date, etc.

An object may include links or references to other objects. For example an opportunity object may include links to contact objects and account objects, an account object may include links to contact objects and so on. An object may have outgoing links that allow the object to refer to other objects as well as incoming links that allow other objects to refer to the object.

The search query parser 210 parses various components of a search query. The search query parser 210 checks if the search query conforms to a predefined syntax. The search query parser builds a data structure representing information specified in the search query. For example, the search query parser 210 may build a parse tree structure based on the syntax of the search query. The data structure provides access to various components of the search query to other modules of the online system 100.

The query execution module 220 executes the search query to determine the search results and candidate objects based on the search query. The search results determined represent the objects stored in the object store 160 that satisfy the search criteria specified in the search query, and the candidate objects determined represent the objects stored in the object store 160 which were identified as candidate objects based on certain criteria (e.g., most recently used objects or most frequently used objects) and satisfy the search criteria specified in the search query. Accordingly, the query execution module 220 develops a query plan for executing a search query. The query execution module 220 executes the query plan to determine the search results and candidate objects that satisfy the search criteria specified in the search query. As an example, a search query may request all objects of a particular object type that include certain search terms. The query execution module 220 identifies objects of the specified object type that include the search terms as specified in the search criteria of the search query. The query execution module 220 provides a set of identified objects, also referred to as search results, to the feature extraction module 240. The query execution module 220 also provides a set of identified candidate objects to the feature extraction module 240. In an embodiment, the identified candidate objects are a subset of a set of candidate objects maintained in the object store 160 and/or an object cache 360 on the client device 110.

The feature extraction module 240 extracts features of objects from a given set of objects and provides the extracted features to the feature weight determination module 250. In an embodiment, the feature extraction module 240 represents a feature using a name and a value. The features describing the objects may depend on the type of object. Some features may be independent of the type of the object and apply to all types of objects. Examples of features extracted by the feature extraction module 240 include a time of the last modification of an object or the age of the last modification determined based of the length of time interval between the present time and the last time of modification. One feature is entity type.

Other examples of a feature extracted by the feature extraction module 240 include a time of the last activity associated with an object or the age of the last activity associated with the object as determined based of the length of time interval between the present time and the time of the last activity associated with the object. For example, a timestamp. An activity associated with an object may be a modification to the object, an access operation performed on the object, a link created to the object from another object, and so on. Another example of a feature extracted by the feature extraction module 240 is a rate of activity associated with an object. The rate of activity may be measured based on a number of activities associated with the object in a unit time interval as determined by normalizing activities over a time period.

The feature extraction module 240 extracts object type specific features from certain objects. For example, if an object represents an opportunity or a potential transaction, the feature extraction module 240 extracts a feature indicating whether an object representing an opportunity is closed or a feature indicating an estimate of time when the opportunity is expected to close. As another example, if an object represents a case, feature extraction module 240 extracts features describing the status of the case, status of the case indicating whether the case is a closed case, an open case, an escalated case, and so on.

The feature weight determination module 250 determines weights for features and assigns scores for features of objects determined to be search results or candidate objects by the query execution module 220. Each search result and each candidate object is an object from which one or more features have been extracted. Because each feature represents an object in some way, the relevance of a feature for a given search request 140 has an impact upon the overall relevance of the object for the given search request 140. Different features have different contribution to the overall measure of relevance of the object. The differences in relevance among features of an object with regards to a search request 140 are represented as weights, wherein features found to more greatly correspond with an object's relevance are weighted more, and features found to correspond less to an object's relevance are weighted less. Each feature of each determined search result and each candidate object is scored according to its relevance to search criteria of the search request, then those scores are weighted and combined to create a relevance score for each search result and each candidate object. In an embodiment, the relevance score for a candidate object also factors in a most recent use timestamp.

Feature weights may be determined by analysis of search performance. This can be done using machine learning, for example. This may be done by converting an object's features into a feature vector. Dimensionality reduction (e.g., via linear discriminant analysis, principle component analysis, etc.) may be used to reduce the amount of data in the feature vector to a smaller, more representative core set of features. Schemes for weighting features, by search request, may be saved in the object store 160 or search logs store 270 as models. The training set for the models that will be used is a subset of the overall data set that is representative of the data to be ranked, including positive and negative examples of the ranking of objects on which the model is being trained. In supervised training, rankings of example objects representing specific features are provided as training sets. The training process provides models that can then be used to rank objects that the model has not encountered before. Machine learning algorithms used include support vector machines (SVMs), boosting for other algorithms (e.g., Ada-Boost), neural net, logistic regression, naive Bayes, memory-based learning, random forests, bagged trees, decision trees, boosted trees, boosted stumps, etc.

Random forest classification based on predictions from a set of decision trees may be used to train a model. Each decision tree splits the source set into subsets based on an attribute value test. This process is repeated in a recursive fashion. A decision tree represents a flow chart, where each internal node represents a test on an attribute. For example, if the value of an attribute is less than or equal to a threshold value, the control flow transfers to a first branch and if the value of the attribute is greater than the threshold value, the control flow transfers to a second branch. Each branch represents the outcome of a test. Each leaf node represents a class label, i.e., a result of a classification.

Each decision tree uses a subset of the total predictor variables to vote for the most likely class for each observation. The final random forest score is based on the fraction of models voting for each class. A model may perform a class prediction by comparing the random forest score with a threshold value. In some embodiments, the random forest output is calibrated to reflect the probability associated with each class.

The weights of features for predicting relevance of different search requests with different sets of search criteria and features may be different. Accordingly, a different machine learning model may be trained for each search request or cluster of similar search requests and applied to search queries with the same set of dimensions. Alternatively, instead of machine learning, depending upon embodiment, the system may use other techniques to adjust the weights of various features per object per search request, depending upon user interaction with those features. For example, if a candidate object is interacted with multiple times in response to various similar search requests, those interactions may be recorded and the candidate object may thereafter be given a much higher relevance score, or distinguishing features of that candidate object may be weighted much greater for future similar search requests. In an embodiment, the information identifying the candidate object that was selected by the user is provided as a labeled training dataset for training the machine learning model configured to determine weights of features used for determining relevance scores.

A factor which impacts the weight of a feature vector, or a relevance score overall, is user interaction with the corresponding object. If a user selects one or more candidate objects for further interaction, those candidate objects are deemed relevant to the search request, and therefore the system records those interactions and uses those stored records to improve object ranking for the subsequent search requests. An example of a user interaction with a candidate object is selecting the candidate object by placing the cursor on a portion of the user interface displaying the candidate object and clicking on the candidate object to request more data describing the candidate object. This is an explicit user interaction performed by the user via the user interface. However, not all user interactions are explicit. Embodiments of the invention identify implicit interactions, such as the user placing the cursor on the portion of the user interface displaying the candidate object while reading the search summary presented with the candidate object without explicitly clicking on the candidate object. Such implicit interactions also indicate the relevance of the candidate object. Hence, the online system considers implicit user interactions when ranking candidate objects by tracking them, such as by a pointer device listener 310.

Other implicit user interactions are associated with the search query and represents the mechanism of entry of the search query. For example, the explicit interaction associated with a search query corresponds to a submit operation that causes the client device to explicitly send the search request to the online system for processing. However before the user explicitly submits a search query, the system monitors several implicit interactions by the user for entering the search query, for example, the mode of input for individual search query terms. The mode of input indicates the mechanism used by a user via the user interface to enter a particular search query term, for example, by performing a cut-and-paste operation, by performing a drag and drop operation, or by typing individual letters via the keyboard.

The search result ranking module 230 ranks search results determined by the query execution module 220 for a given search query, as well as candidate objects. For example, the system may perform this by applying a stored ranking model to the features of each candidate object and thereafter sorting the candidate objects in descending order of relevance score. Factors such as object interaction, explicit and implicit, also impact the ranking of each candidate object. Candidate objects which have been interacted with for a given search request are ranked higher than other candidate objects for similar search requests. In one embodiment, candidate objects which have been explicitly interacted with are ranked higher than candidate objects which have been implicitly interacted with since an explicit interaction can be determined with a higher certainty than an implicit user interaction.

In one embodiment, entity type is one of the features used for determining relevance of candidate objects for ranking them. For a cluster of similar search requests, the online system determines, for each entity type that may be returned as a candidate object, a weight based on an aggregate number of implicit and/or explicit user interactions with candidate objects of that entity type. Accordingly, the online system weighs objects of certain entity types as more relevant than objects of other entity types for that cluster of search queries. Accordingly, when the online system receives a search request, the online system ranks the candidate objects with entity types rated more relevant for that cluster of search requests higher than candidate objects with entity types rated less relevant for that cluster of search requests.

In some embodiments, the system uses a mode of input of individual search query terms as a feature for ranking candidate objects that match those search query terms. The mode of input represents the mechanism used for data entry for that search query term as described in connection with the pointer device listener 310. Examples of modes of input include using cut-and-paste to enter one or more search query terms, typing individual letters to enter a search query term, or using drag and drop mechanism to enter one or more search query terms.

In some embodiments, the system uses the order in which search query terms were entered as a feature for ranking candidate objects. The order of entry of search query terms indicates which search query terms were entered recently and which search query terms were previously entered. Accordingly, if the user starts entering a search query, the system associates each search query term with a value indicating the order in which the search query term was entered. The user may not always enter search query terms in the order in which the search query terms appear in a search query. For example, the user may enter a search query comprising terms "t1, t2, t3" in that order and then enter the search query term t4 between the terms t1 and t2. Accordingly the partial search query at that stage becomes "t1, t4, t2, t3". The system tracks this order in which the search query terms were entered.

The system determines the search query terms that match each candidate object and determines the relevance score of the candidate object based on feature including the order of entry of the matching search query terms corresponding to the candidate object. For example, the system may rank candidate objects that match recently entered search query terms higher than candidate objects that match only search query terms that were previously entered. This is so because the user is more likely to be interested in the impact of recently entered search query terms as compared to previously entered search query terms. Ranking the candidate objects matching certain search query terms based on the order in which the search query term was entered provides a visibility into the effect of the new search query term that the user entered on candidate objects matching the partial search query.

The search log module 260 stores information describing search requests, also known as search queries, processed by the online system 100 in search logs store 270. The search log module 260 stores the search query received by the online system 100 as well as information describing the candidate objects identified in response to the search query. The search log module 260 also stores information identifying accessed candidate objects. An accessed candidate object represents a candidate object for which the online system receives a request for additional information responsive to providing the candidate objects to a requestor. For example, the candidate objects may be presented to the user via the client device 120 such that each candidate object displays a link providing access to the object. Accordingly, a candidate object is an accessed candidate object if the user clicks on the link presented with the object. An accessed candidate object may also be a candidate object the user has implicitly interacted with.

In an embodiment, the search logs store 270 stores the information in a file, for example, as a tuple comprising values separated by a separator token such as a comma. In another embodiment, the search logs store 270 is a relational database that stores information describing searches as tables or relations. The search logs store 270 may include references to objects stored in the object store 160. For example, each search result may identify an object stored in the object store 160.

Figure 2B:
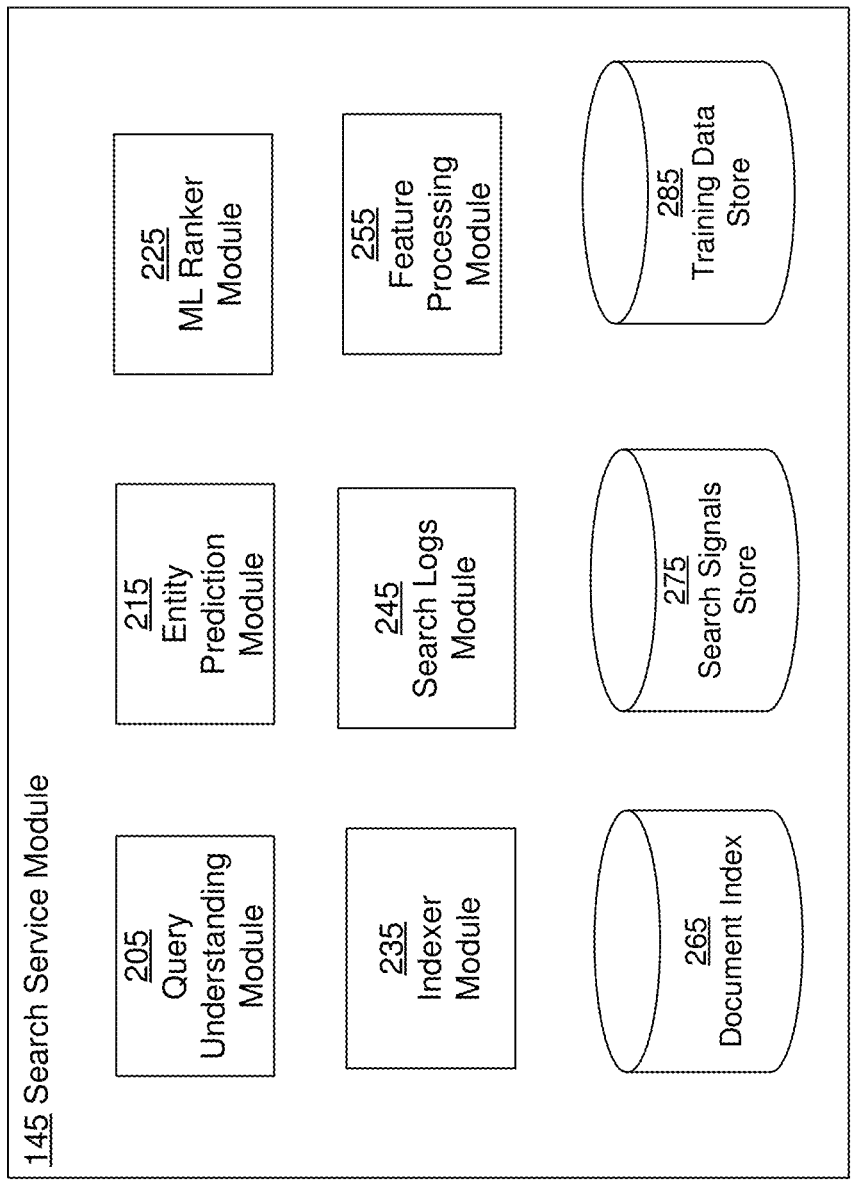
FIG. 2B shows the system architecture of a search service module, in accordance with an embodiment.

FIG. 2B shows the system architecture of a search service module 145, in accordance with an embodiment. The search service module 145 includes a query understanding module 205, an entity prediction module 215, a machine learning (ML) ranker module 225, an indexer module 235, a search logs module 245, a feature processing module 255, a document index 265, a search signals store 275, and a training data store 285. Other embodiments may include other modules in the search service module 145.

The query understanding module 205 determines what the user is searching for, i.e., the precise intent of the search query. It corrects an ill-formed query. It refines query by applying techniques like spell correction, reformulation and expansion. Reformulation includes application of alternative words or phrases to the query. Expansion includes sending more synonyms of the words. It may also send morphological words by stemming.

Furthermore, the query understanding module 205 performs query classification and semantic tagging. Query classification represents classifying a given query in a predefined intent class (also referred to herein as a cluster of similar queries). For example, the query understanding module 205 may classify "curry warriors san francisco" as a sports related query.

Semantic tagging represents identifying the semantic concepts of a word or phrase. The query understanding module 205 may determine that in the example query, "curry" represents a person's name, "warriors" represents a sports team name, and "san francisco" represents a location.

The entity prediction module 215 predicts which entities the user is most likely searching for given search query. In some embodiments, the entity prediction module 215 may be merged into query understanding module.

Entity prediction is based on machine learning (ML) algorithm which computes probability score for each entity for given query. This ML algorithm generates a model which may have a set of features. This model is trained offline using training data stored in training data store 285.

The features used by the ML model can be broadly divided into following categories: (1) Query level features or search query features: These features depend only on the query. While training, the entity prediction module 215 builds an association matrix of queries to identify similar set of queries. It extracts click and hover information from these historical queries. This information serves as a primary distinguishing feature.

The ML ranker module 225 is a machine-learned ranker module. Learning to rank or machine-learned ranking (MLR) is the application of machine learning in the construction of ranking models for information retrieval systems.

There are several standard retrieval models such as TF/IDF and BM25 that are fast enough to be produce reasonable results. However, these methods can only make use of very limited number of features. In contrast, MLR system can incorporate hundreds of arbitrarily defined features.

Users expect a search query to complete in a short time (such as a few hundred milliseconds), which makes it impossible to evaluate a complex ranking model on each document in a large corpus, and so a multi-phase scheme can be used.

Level-1 Ranker: top-K retrieval first, a small number of potentially relevant documents are identified using simpler retrieval models which permit fast query evaluation, such as the vector space model (TF/IDF) and BM25, or a simple linear ML model. This ranker is completely at individual document level, i.e. given a (query, document) pair, assign a relevance score.

Level-2 Ranker: In the second phase, a more accurate but computationally expensive machine-learned model is used to re-rank these documents. This is where heavy-weight ML ranking takes place. This ranker takes into consideration query classification and entity prediction external features from query understanding module and entity prediction module respectively.

The level-2 ranker may be computationally expensive due to various factors like it may depend upon certain features that are computed dynamically (between user, query, documents) or it may depend upon additional features from external system. Typically, this ranker operates on a large number of features, such that collecting/sending those features to the ranker would take time. ML Ranker is trained offline using training data. It can also be further trained and tuned with live system using online A/B testing.

The training data store 285 stores training data that typically consists of queries and lists of results. Training data may be derived from search signals store 275. Training data is used by a learning algorithm to produce a ranking model which computes relevance of results for actual queries.

The feature processing module 255 extracts features from various sources of data including user information, query related information, and so on. For ML algorithms, query-document pairs are usually represented by numerical vectors, which are called feature vectors. Components of such vectors are called features or ranking signals.

Features can be broadly divided into following categories:

(1) Query-independent or static features: These features depend only on the result document, not on the query. Such features can be precomputed in offline mode during indexing. For example, document lengths and IDF sums of document's fields, document's static quality score (or static rank), i.e. document's PageRank, page views and their variants and so on.

(2) Query-dependent or dynamic features: These features depend both on the contents of the document, the query, and the user context. For example, TF/IDF scores and BM25 score of document's fields (title, body, anchor text, URL) for a given query, connection between the user and results, and so on.

(3) Query level features or search query features: These features depend only on the query. For example, the number of words in a query, or how many times this query has been run in the last month and so on.

The feature processing module 255 includes a learning algorithm that accurately selects and stores subset of very useful features from the training data. This learning algorithm includes an objective function which measures importance of collection of features. This objective function can be optimized (maximization or minimization) depending upon the type of function. Optimization to this function is usually done by humans.

The feature processing module 255 excludes highly correlated or duplicate features. It removes irrelevant and/or redundant features that may produce discriminating outcome. Overall this module speeds up learning process of ML algorithms.

The search logs module 245 processes raw application logs from the app logs store by cleaning, joining and/or merging different log lines. These logs may include: (1) Result click logs—The document id, and the result's rank etc. (2) Query logs—The query id, the query type and other miscellaneous info. This module produces a complete snapshot of the user's search activity by joining different log lines. After processing, each search activity is stored as a tuple comprising values separated by a token such as comma. The data produced by this module can be used directly by the data scientists or machine learning pipelines for training purposes.

The search signals store 275 stores various types of signals that can be used for data analysis and training models. The indexer module 235 collects, parses, and stores document indexes to facilitate fast and accurate information retrieval.

The document index 265 stores the document index that helps optimize speed and performance in finding relevant documents for a search query. Without an index, the search engine would scan every document in the corpus, which would require considerable time and computing power. For example, while an index of 10,000 documents can be queried within milliseconds, a sequential scan of every word in 10,000 large documents could take hours.

The document index 265 may be an inverted index that helps evaluation of a search query by quickly locating documents containing the words in a query and then ranking these documents by relevance. Because the inverted index stores a list of the documents containing each word, the search engine can use direct access to find the documents associated with each word in the query in order to retrieve the matching documents quickly.

Figure 3A:
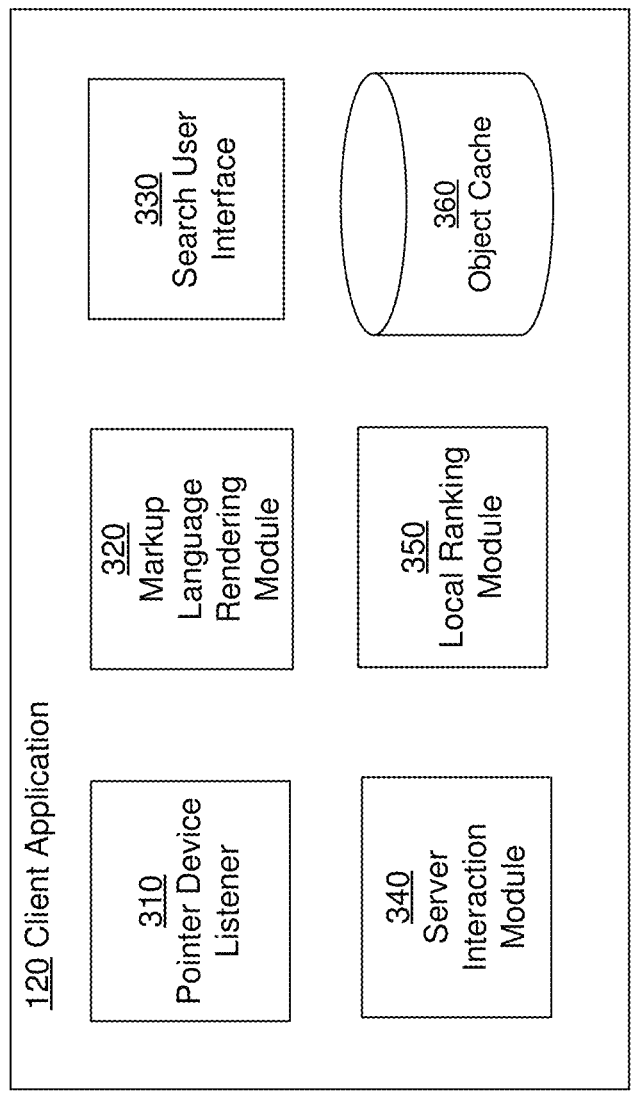
FIG. 3A shows the system architecture of a client application, in accordance with an embodiment.

FIG. 3A shows the system architecture of a client application, in accordance with an embodiment. The client application 120 comprises the pointer device listener 310, a markup language rendering module 320, a search user interface 330, a server interaction module 340, a local ranking module 350, and the object cache 360.

The object cache 360 caches objects from the object store 160 which are shared with the client application 120 by the online system 100. Accordingly, the object cache stores candidate objects that may be returned as partial search query results in response to partial search queries entered by a user. Objects cached in the object cache 360 may represent most recently used objects or most frequently used objects. In an embodiment, objects cached in the object cache 360 represent past searches performed by a user of the client application 120.

The search user interface 330 allows the user to interact with the client application 120 to perform search functions, such as search the object store 160. The search user interface 330 may comprise physical and/or on-screen buttons, which the user may interact with to perform various functions with the client application 120. For example, the search user interface 330 may comprise a query field wherein the user may enter a search query, as well as a results field wherein search results are displayed, and a field wherein candidate objects are displayed. In an embodiment, users may interact with search results and candidate objects by selecting them with a cursor.

The markup language rendering module 320 works with the server interaction module 340 and the search user interface 330 to present information to the user. The markup language rendering module 320 processes data from the server interaction module 340 and converts it into a form usable by the search user interface 330. For example, the markup language rendering module 320 could ingest an HTTP response and format the response into an object for storage in the object cache 360. In one embodiment, the markup language rendering module 320 works with the browser of the client application 120 to support display and functionality of the search user interface 330.

The local ranking module 350 works with the search result ranking module 230 of the search module 130 to rank search results and candidate objects. The local ranking module 350 may re-rank search results or candidate objects received from the online system based on information available at the client device, for example, implicit user interactions. Depending upon embodiment, search results or candidate objects may be ranked partially or entirely by the local ranking module 350 and/or the search result ranking module 230. Similar to the search result ranking module 230, the local ranking module 350 evaluates search results and candidate objects based on their features and other factors such as user interaction history, both explicit and implicit, to develop a relevance score for each search result and candidate object. The local ranking module 350 may be implemented similarly to the search result ranking module 230, which shall not be detailed again for the sake of brevity.

The pointer device listener 310 monitors and records user interactions with the client application 120. For example, the pointer device listener 310 tracks the cursor movements and sends a request to the search log module 260 every time a candidate object is selected using the cursor. If the user clicks on a search result causing a request to be sent to the online system for additional details describing the search result, this becomes an explicit interaction. The pointer device listener 310 also tracks implicit interactions, such as candidate objects over which the cursor hovers for a certain period of time. For example, each of a set of candidate objects occupies an area of the search user interface 330, and the pointer device listener 310 logs every time the cursor stays within a candidate object's area of the search user interface 330 for more than a threshold amount of time. Those logged implicit interactions may be communicated to the online system 100 via the network 150 by the client application 120 using the server interaction module 340. Alternatively or additionally, the implicit and explicit user interactions are stored in the object cache 360 and/or object store 160.

Depending upon the embodiment, the pointer device listener 310 records other types of interactions, explicit and/or implicit, in addition to or alternatively to those detailed supra. One type of user interaction recorded by the pointer device listener 310 is a user copying a candidate object, for example, for pasting it in another portion of the same user interface or a user interface of another application. The user interface of the client device may allow the user to select a region of the user interface without sending an explicit request to the online system. For example, if candidate objects comprise a phone number, the pointer device listener 310 could log which candidate object had its phone number copied. Another type of user interaction recorded by the pointer device listener 310 is a user screenshotting one or more search results or candidate objects. If a user uses a feature of the client application 120 or other functionality of the client device 110, such as a screenshot application, to screenshot one or more search results and/or candidate objects, the pointer device listener 310 logs which search results and/or candidate objects were captured by the screenshot.

In an embodiment, the pointer device listener 310 monitors the mechanism used by a user to enter different portions of a search query entered by the user. For example, the user may enter a first portion of the search query by cutting from a previous search query and pasting it into the widget of the user interface used for entering search queries. However, the user may enter the remaining portion of the search query by typing the individual letters from the keyboard. Accordingly, the system maintains a set of modes of input and associates portions of an input search query with different modes of input. For example, a first mode of input may be "cut-and-paste" representing a cutting and pasting operation for entering a sequence of letters and a second mode of input may be "keyboard entry" for individually typing each letter via the keyboard. Another mode of entry is drag and drop of a sequence of letters, for example, by selecting a portion of a document and dragging and dropping that portion into the widget used for entering search queries.

The pointer device listener 310 monitors the modes of entries of portions of search queries and stores them, for example, as logs. For example, the pointer device listener 310 may log that a first subset of search query terms entered by the user were provided using a first mode of input and a second subset of search query terms for the same query were entered using a second mode of input. The system uses the mode of input of search query terms as a feature for ranking candidate objects representing partial search query results. For example, a candidate object O1 may be selected for presenting as partial search query result if the candidate object O1 has occurrences of a search query term T1 and a candidate object O2 may be selected for presenting as partial search query result if the candidate object O2 has occurrences of a search query term T2. Also, assume that the search query terms T1 was entered using a mode of input M1 and the search query terms T2 was entered using a mode of input M2. Accordingly, the system uses the modes of entry for weighing the corresponding candidate objects. In an embodiment, candidate objects that match search query terms entered using a mode of input representing keyboard entry of letters are ranked higher than candidate objects that match search query terms entered using a mode of input representing a cut-and-paste. This is so, because the keyboard entry of individual letters indicate a higher likelihood of the user thinking and figuring out the subsequent search query terms as the user continues typing. As a result, the user is more likely to determine the impact of the search query terms being entered. The system accordingly ranks the candidate objects matching these search query terms higher than other search query terms. For example, a user may delete the last search query term entered and enters another search query term. The system ranks the candidate objects based on the mode of input of the individual search query terms, thereby providing the user, visibility into the effect of these search query terms on the partial search query results.

The interactions logged by the pointer device listener 310 may be used to adjust search result rankings and/or candidate object rankings, as detailed supra, done by the local ranking module 350 and/or the search result ranking module 230.

Figure 3B:
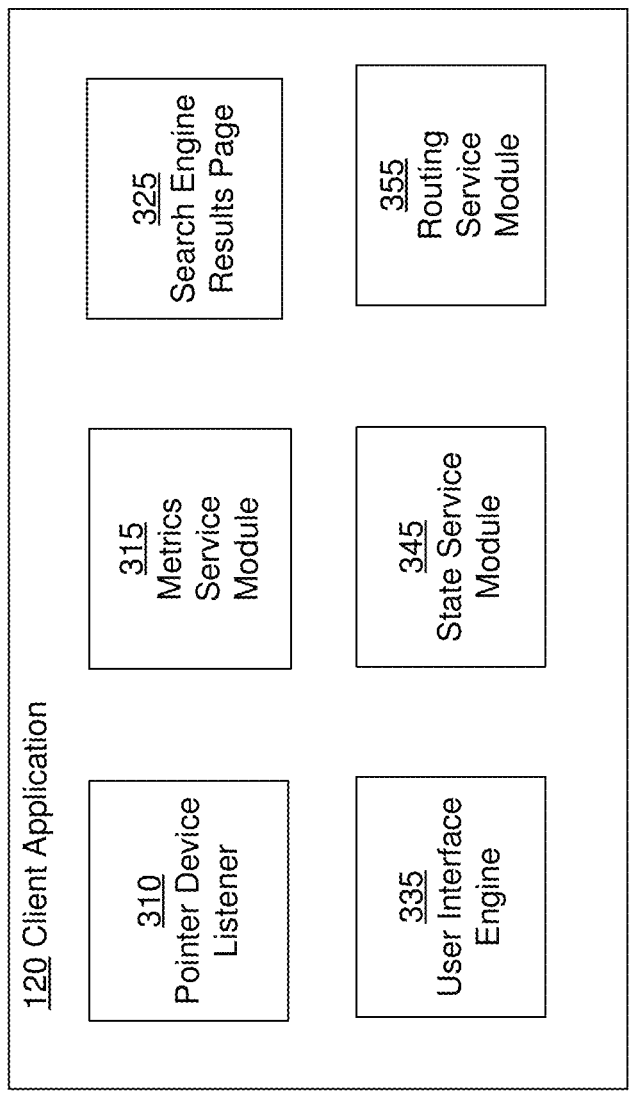
FIG. 3B shows the system architecture of a client application, in accordance with an embodiment.

FIG. 3B shows the system architecture of a client application, in accordance with an embodiment. As shown in FIG. 3B, the client application comprises the pointer device listener 310 (as described above in connection with FIG. 3A), a metrics service nodule 315, a search engine results page 325, a UI (user interface) engine 335, a state service module 345, and a routing service module 355. Other embodiments may include different modules than those indicated here.

Client applications are becoming increasingly complicated. The state service module 345 manages the state of the application. This state may include responses from server side services and cached data, as well as locally created data that has not been yet sent over the wire to the server. The state may also include active actions, state of current view, pagination and so on.

The metrics service nodule 315 provides APIs for instrumenting user interactions in a modular, holistic and scalable way. It may also offer ways to measure and instrument performance of page views. It collects logging events from various views within the client application. It may batch all these requests and send it over to instrumentation service module 135 for generating the persisted log lines in app log store 165.

The UI engine 335 efficiently updates and renders views for each state of the application. It may manage multiple views, event handling, error handling and static resources. It may also manage other aspects such as localization.

The routing service module 355 manages navigation within different views of the application. It contains a map of navigation routes and associated views. It usually tries to route application to different views without reloading of the entire application.

The search engine results page 325 is used by the user to conduct searches to satisfy information needs. User interacts with the interface by issuing a search query, then reviewing the results presented on the page to determine which or if any results may satisfy user's need. The results may include documents of one or more entity types. Results are typically grouped by entities and shown in the form of sections that are ordered based upon relevance.

User may move pointer device around the page, hovering over and possibly clicking on result hyperlinks. The page under the hood tracks pointer device to track explicit as well as implicit user interaction. Explicit user interaction such as click on hyperlink or copy-paste. On other hand, implicit interaction includes hovering over the results while user examines the results. These interactions are instrumented by dispatching events to the metrics service module 315. The pointer device listener 310 monitors a cursor used for clicking results and hovering/scrolling on results page.

Figure 4A:
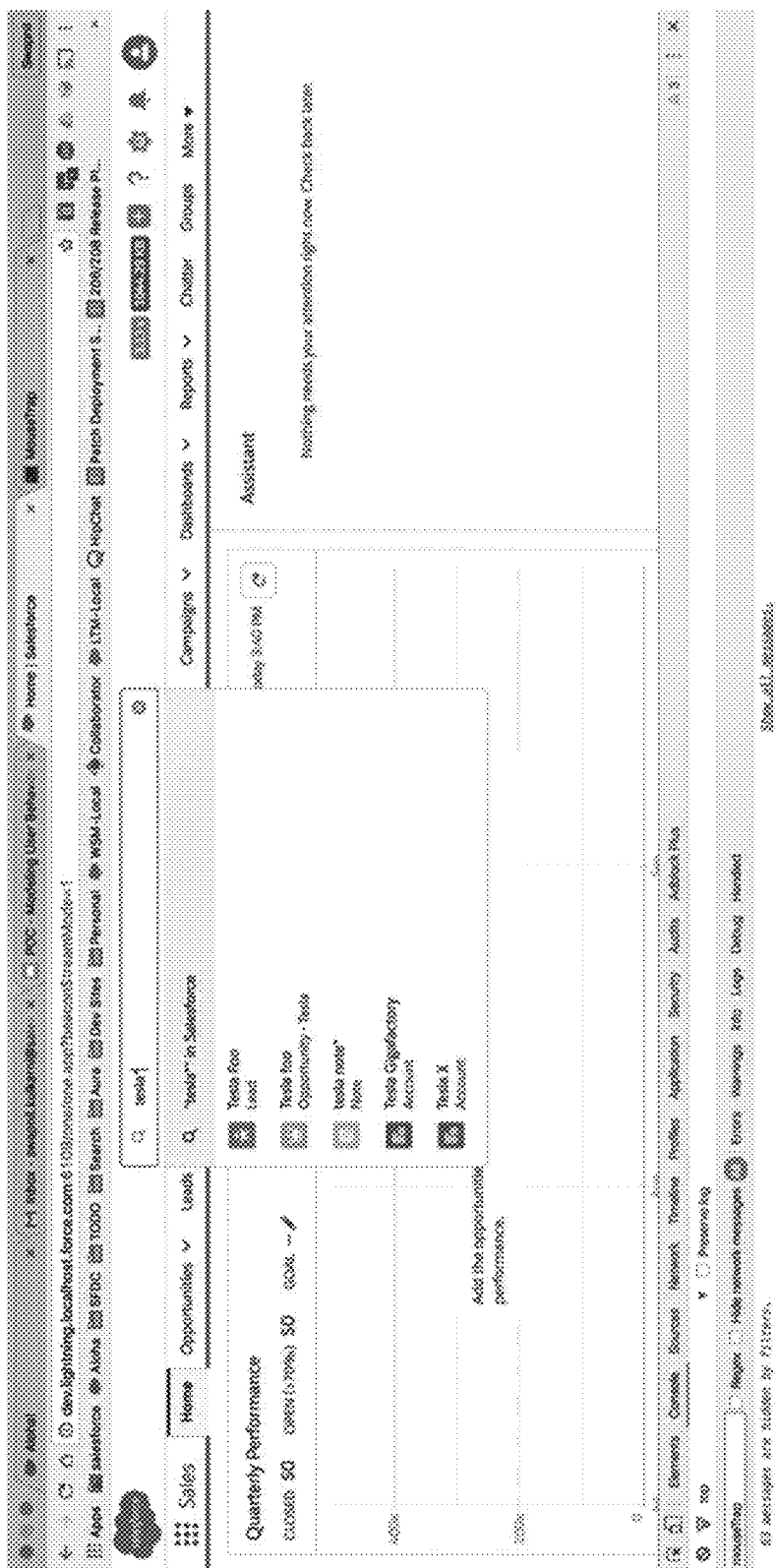
FIG. 4A shows a screen shot of a user interface for monitoring implicit user interactions with candidate objects, in accordance with an embodiment.

FIG. 4A shows a screen shot of a user interface for monitoring implicit user interactions with candidate objects, in accordance with an embodiment. In this embodiment the client application 120 comprises a browser. The candidate objects that are represent partial search query results are candidate search queries that are presented as possible completions of the partial search query entered by the user. As seen in the figure, there is a set of five candidate objects displayed, each with its own area of the user interface, which are displayed in response to a search request which was entered by the user in a different region of the user interface. If the cursor hovers over a specific result, it may be recorded as an implicit user interaction by the pointer listening device 310 if the cursor remains there for at least a set period of time. For example, the system may be configured such that a cursor remaining in an area of a candidate object for longer than five seconds is recorded as an implicit user interaction.

In some embodiments, the pointer device listener 310 may record only a feature of candidate objects implicitly interacted with by the user. For example, entity type. When used for adjusting candidate object rankings, candidate objects comprising that entity type will be given a greater relevance score for search queries similar to the search query of the figure.

Figure 4B:
FIG. 4B shows another screen shot of a user interface for monitoring implicit user interactions with candidate objects, in accordance with an embodiment.

FIG. 4B shows another screen shot of a user interface that allows monitoring of implicit user interactions with search results, in accordance with an embodiment. In this embodiment the client application 120 comprises a browser. The candidate objects displayed in response to receiving a partial search query are search results obtained from a set of candidate objects (e.g., entities) by executing the partial search query. The search page displaying the search results may automatically update as search terms change. These selected candidate objects allow a user to inspect the partial search query to give an insight into the partial search query entered so far, thereby allowing the user to make an informed decision on how to complete the search query.

As seen in the FIG. 4B, there are three accounts displayed as search results, each with its own area of the user interface, which are displayed in response to a partial search query which was entered by the user in a different region of the user interface. As shown in the figure, the cursor is hovering over the third result, which may be recorded as an implicit user interaction by the pointer listening device 310 if the cursor remains there for at least a set period of time. For example, the system may be configured such that a cursor remaining in an area of a search result for longer than five seconds is recorded as an implicit user interaction.

In this example, the pointer listening device 310 records the interactions, as seen in a console display region on the figure. In an embodiment, the system stores log entries, several of which comprise cursor location data and corresponding search results, for later use in search result ranking. In some embodiments, the pointer device listener 310 may record only a feature of search results implicitly interacted with by the user. In this example, that feature is entity type.

System Process

A process associated with searches performed by online system 100 is described herein. The steps described herein for the process can be performed in an order different from those described herein. Furthermore, the steps may be performed by different modules than those described herein.

Figure 5:
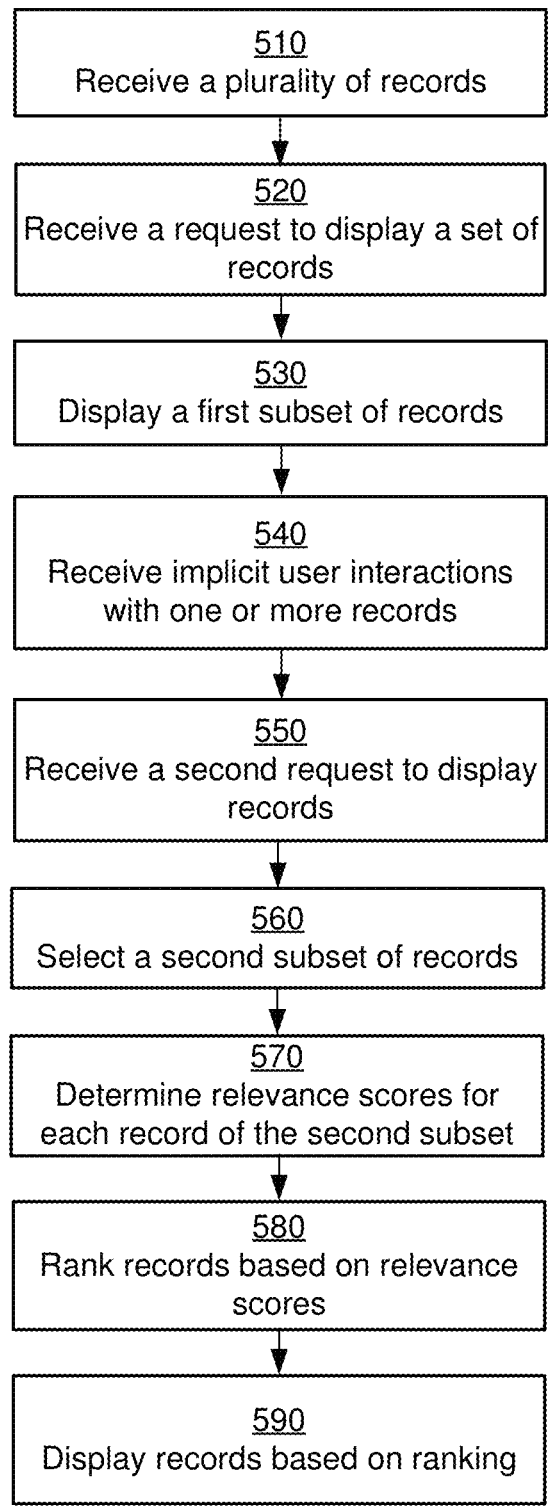
FIG. 5 shows the process of collecting implicit user interaction data for determining entity type relevance scores, in accordance with an embodiment.

FIG. 5 shows the process of collecting implicit user interaction data for determining entity type relevance scores, in accordance with an embodiment. The search query may be received from a client application 120 executing on a client device 110 via the network 150. In some embodiments, the search query may be received from an external system, for example, another online system via a web service interface provided by the online system 100.

The client device 110 receives 510 a plurality of candidate objects. In an embodiment, the candidate objects received by the client device are from the object store 160.

The client device 110 receives 520 a search request as detailed supra, or may be a partial search request, e.g. a search request which has been partially entered into a search field of the search user interface 330. For example, the user desires to enter "Account XYZ" into a search field of the search user interface 330 using a keyboard. If the user enters "Account X" into the search field, the client device 110 can execute the method using "Account X" as the request. In some embodiments, the client device 110 would treat each set of characters as a different request, executing and replacing the previous output as the user enters another character using the keyboard. For this example, "A", "Ac", "Acc", "Acco", and so on would each be treated as a request for which the method would be performed, the output of each method replacing the previous as the search request continues to be entered into the search field, up until the user finishes typing the search request "Account XYZ" which invokes a last execution of the method.

The client device 110 displays 530 via the search user interface 330 a subset of objects selected from the received set of objects, wherein each object is displayed within an area of the user interface. Responsive to receipt of a request, the system received a set of objects; the client device 110 displays at least one of those objects. For example, the client device 110 lists, using the search user interface 300, a subset of objects comprising the five candidate objects of the received set of objects.

The client device 110 receives 540 implicit user interactions with one or more objects of the subset of objects displayed via the search user interface 330. For example, each implicit user interaction comprises presence of a cursor for greater than a threshold time within a certain area of the search user interface 330 displaying one or more objects. As detailed supra, implicit user interactions may comprise other acts such as screenshotting or copying an area of the search user interface 330.

The client device 110 receives 550 a second request to display a set of records. The second request is similar to the request of step 520 and as such, for the sake of brevity, shall not be detailed.

The client device 110 selects 560 a second subset of objects from the received set of objects based on the second request. The selected second subset of objects may comprise, for example, objects which match search criteria of the second request.

The client device 110 determines 570 a relevance score for each object from the second subset of objects. Determining a relevance score functions as detailed supra using the search result ranking module 230 and/or local ranking module 350. Implicit user interactions previously tracked by the pointer device listener 310 and stored in the object store 160 affect the relevance scores of objects which are found to have been implicitly interacted with by the user on previous occasions for similar search requests, e.g. a search request from the same search request cluster the second request is clustered within. Implicit user interactions with the search query terms of the search query being entered as well as records presented as partial search query results for the current query are also used as features for determining relevance scores of objects. For example, if two objects are initially determined to have the same relevance score, but the first object had stored implicit user interactions and the other did not, the first object would receive a greater relevance score than the other.

The client device 110 ranks 580 the second subset of objects based on their relevance scores. For example, the client device 110 may rank the second subset of objects in descending order by relevance score, with the object with the greatest relevance score ranked first, the object with the next greatest relevance score ranked second, and so on.

The client device 110 displays 590 the second subset of records according to the ranked order, in a manner similar to the displaying of step 530, which shall not be detailed again for the sake of brevity.

Computer Architecture

Figure 6:
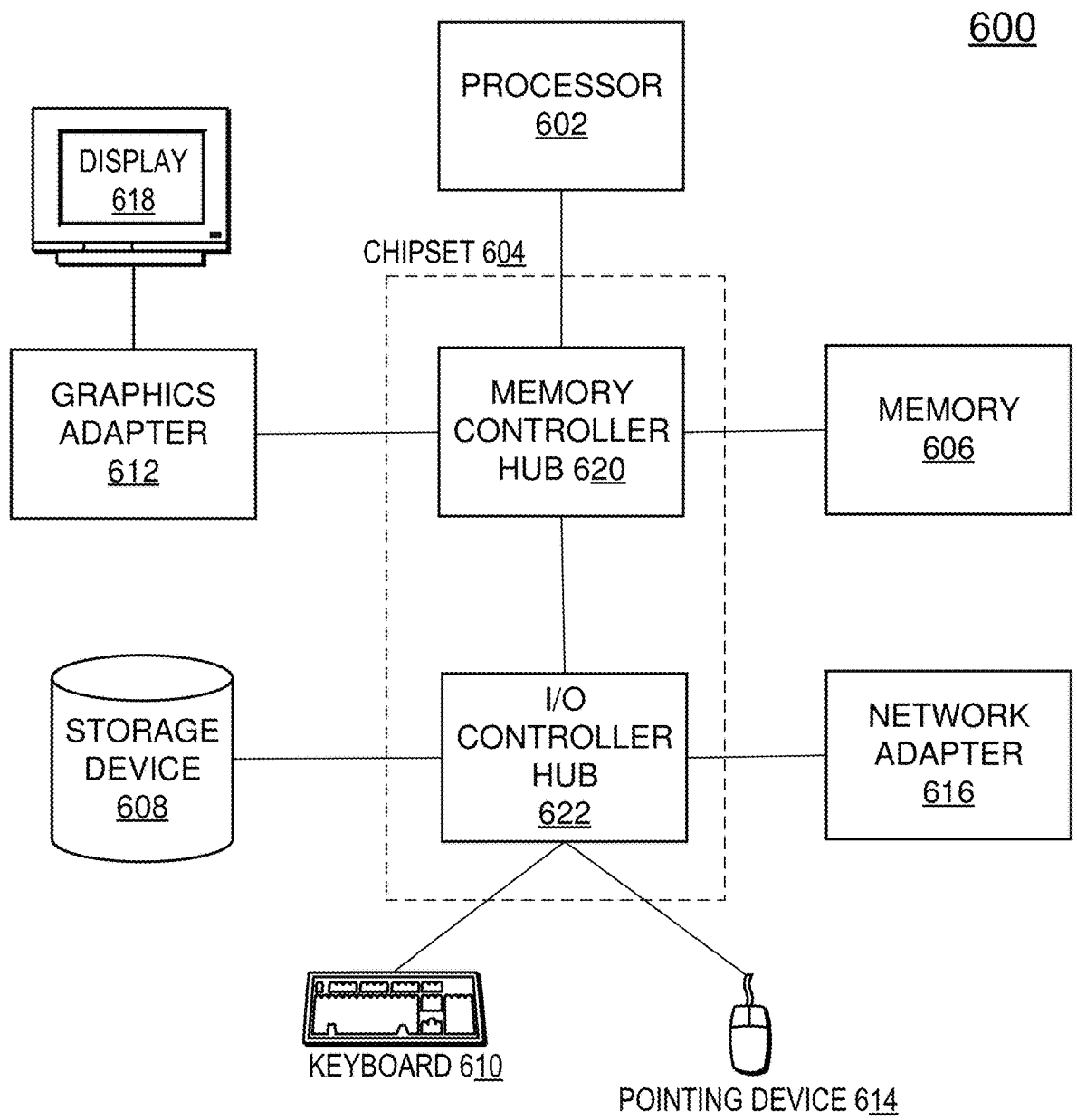
FIG. 6 is a high-level block diagram of a computer for acting as a client device or online system.

The entities shown in FIG. 1 are implemented using one or more computers. FIG. 6 is a high-level block diagram of a computer 600 for acting as a client device 110 or online system 100. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network 150.

As is known in the art, a computer 600 can have different and/or other components than those shown in FIG. 6. In addition, the computer 600 can lack certain illustrated components. For example, the computer acting as the online system 100 can be formed of multiple blade servers linked together into one or more distributed systems and lack components such as keyboards and displays. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Alternative Embodiments

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the Figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

I claim:

1. A computer implemented method for causing display of records via a user interface, the method comprising:
   receiving, by a processor, a first request to display a set of records;
   causing display, by the processor, via the user interface, of a first plurality of records;
   receiving, by the processor, a representation of an implicit user interaction with a respective record of the first plurality of records displayed via the user interface, wherein the implicit user interaction comprises presence of a cursor within an area of the user interface for more than a threshold time, the area of the user interface corresponding to the respective record of the first plurality of records, and wherein the presence of the cursor within the area of the user interface is responsive to user input to move the cursor to the area;
   receiving, by the processor, a second request to display a set of records;
   identifying a cluster of requests similar to the second request;
   identifying a set of related records comprising records displayed responsive to the requests in the cluster of requests;
   determining, for at least one of a plurality of entity types, a number of implicit user interactions with records of the entity type in the identified set of related records;
   determining, for at least one of the plurality of entity types, a respective entity type score based on the respective number of implicit user interactions;
   determining, by the processor, a relevance score for respective records from a second plurality of records, wherein the second plurality of records includes the respective record corresponding to the received representation of the implicit user interaction, and wherein the relevance score for the respective record is based on the received representation of the implicit user interaction and on a determined entity type score corresponding to an entity type of the respective record;
   ranking, by the processor, the second plurality of records based on the respective relevance scores; and
   causing display, by the processor, via the user interface, the second plurality of records according to the ranking.

2. The method of claim 1, wherein the second request to display a set of records identifies an entity type, wherein the second request is for records of the identified entity type.

3. The method of claim 1, wherein the second request to display a set of records comprises a partial search query entered via a widget of the user interface.

4. The method of claim 1, wherein the relevance score for the record corresponding to the implicit user interaction is proportionate to an aggregate amount of time spent by the cursor within the area of the user interface.

5. The method of claim 1, wherein the relevance score for a record of the second plurality of records is based at least in part on a number of times records, comprising a similar entity type as the record of the second plurality of records that corresponds to the entity type of the second request to display records, are selected for display, wherein the cursor was present for more than the threshold time within an area of the user interface displaying the record comprising the entity type.

6. The method of claim 1, further comprising:
storing, by the processor, aggregate data describing implicit user interactions associated with records; and
wherein determining a relevance score for a record from the second plurality of records is based on the aggregate data describing implicit user interactions associated with the record from the second plurality of records.

7. The method of claim 1, further comprising:
receiving, by the processor, implicit user interactions representing modes of input of individual search query terms; and
wherein determining a relevance score for a record from the second plurality of records is based on features comprising the mode of input of search query terms that match the record.

8. The method of claim 7, wherein a mode of input indicates a mechanism of entering the search query term via the user interface, the mode of input representing at least one of: cut and paste operation, drag and drop operation, or typing of individual letters.

9. A non-transitory computer-readable storage medium storing computer program instructions executable by a processor to perform operations for causing display of records via a user interface, the operations comprising:
receiving, by a processor, a first request to display a set of records;
causing display, by the processor, via the user interface, of a first plurality of records;
receiving, by the processor, a representation of an implicit user interaction with a respective record of the first plurality of records displayed via the user interface, wherein the implicit user interaction comprises presence of a cursor within an area of the user interface for more than a threshold time, the area of the user interface corresponding to the respective record of the first plurality of records, and wherein the presence of the cursor within the area of the user interface is responsive to user input to move the cursor to the area;
receiving, by the processor, a second request to display a set of records;
identifying a cluster of requests similar to the second request;
identifying a set of related records comprising records displayed responsive to the requests in the cluster of requests;
determining, for at least one of a plurality of entity types, a number of implicit user interactions with records of the entity type in the identified set of related records;
determining, for at least one of the plurality of entity types, a respective entity type score based on the respective number of implicit user interactions;
determining, by the processor, a relevance score for respective records from a second plurality of records, wherein the second plurality of records includes the respective record corresponding to the received representation of the implicit user interaction, and wherein the relevance score for the respective record is based on the received representation of the implicit user interaction and on a determined entity type score corresponding to an entity type of the respective record;
ranking, by the processor, the second plurality of records based on the respective relevance scores; and
causing display, by the processor, via the user interface, the second plurality of records according to the ranking.

10. The non-transitory computer-readable storage medium of claim 9, wherein the second request to display a set of records identifies an entity type, wherein the second request is for records of the identified entity type.

11. The non-transitory computer-readable storage medium of claim 9, wherein the second request to display a set of records comprises a partial search query entered via a widget of the user interface.

12. The non-transitory computer-readable storage medium of claim 9, wherein the relevance score for the record corresponding to the implicit user interaction is proportionate to an aggregate amount of time spent by the cursor within the area of the user interface.

13. The non-transitory computer-readable storage medium of claim 9, wherein the relevance score for a record of the second plurality of records is based at least in part on a number of times records, comprising a similar entity type as the record of the second plurality of records that corresponds to the entity type of the second request to display records, are selected for display, wherein the cursor was present for more than the threshold time within an area of the user interface displaying the record comprising the entity type.

14. The non-transitory computer-readable storage medium of claim 9, the operations further comprising:
storing, by the processor, aggregate data describing implicit user interactions associated with records; and
wherein determining a relevance score for a record from the second plurality of records is based on the aggregate data describing implicit user interactions associated with the record from the second plurality of records.

15. The non-transitory computer-readable storage medium of claim 9, the operations further comprising:
receiving, by the processor, implicit user interactions representing modes of input of individual search query terms; and
wherein determining a relevance score for a record from the second plurality of records is based on features comprising the mode of input of search query terms that match the record.

16. The non-transitory computer-readable storage medium of claim 15, wherein a mode of input indicates a mechanism of entering the search query term via the user interface, the mode of input representing at least one of: cut and paste operation, drag and drop operation, or typing of individual letters.

17. A computer system comprising:
a processor; and
a non-transitory computer-readable storage medium storing computer program instructions executable by the processor to perform operations for causing display of records via a user interface, the operations comprising:
receiving, by a processor, a first request to display a set of records;
causing display, by the processor, via the user interface, of a first plurality of records;
receiving, by the processor, a representation of an implicit user interaction with a respective record of the first plurality of records displayed via the user interface, wherein the implicit user interaction comprises presence of a cursor within an area of the user interface for more than a threshold time, the area of the user interface corresponding to the respective record of the first plurality of records, and wherein the presence of the cursor within the area of the user interface is responsive to user input to move the cursor to the area;

receiving, by the processor, a second request to display a set of records;

identifying a cluster of requests similar to the second request;

identifying a set of related records comprising records displayed responsive to the requests in the cluster of requests;

determining, for at least one of a plurality of entity types, a number of implicit user interactions with records of the entity type in the identified set of related records;

determining, for at least one of the plurality of entity types, a respective entity type score based on the respective number of implicit user interactions;

determining, by the processor, a relevance score for respective records from a second plurality of records, wherein the second plurality of records includes the respective record corresponding to the received representation of the implicit user interaction, and wherein the relevance score for the respective record is based on the received representation of the implicit user interaction and on a determined entity type score corresponding to an entity type of the respective record;

ranking, by the processor, the second plurality of records based on the respective relevance scores; and causing display, by the processor, via the user interface, the second plurality of records according to the ranking.

18. The method of claim 1, wherein the processor is a component of a client device.

19. The method of claim 1, wherein the processor is a component of an online system.

20. The non-transitory computer-readable storage medium of claim 9, wherein the processor is a component of an online system.

* * * * *